March 14, 1933.  J. RAH  1,901,666
CABLE TERMINATOR CAP ASSEMBLY
Filed Jan. 22, 1930
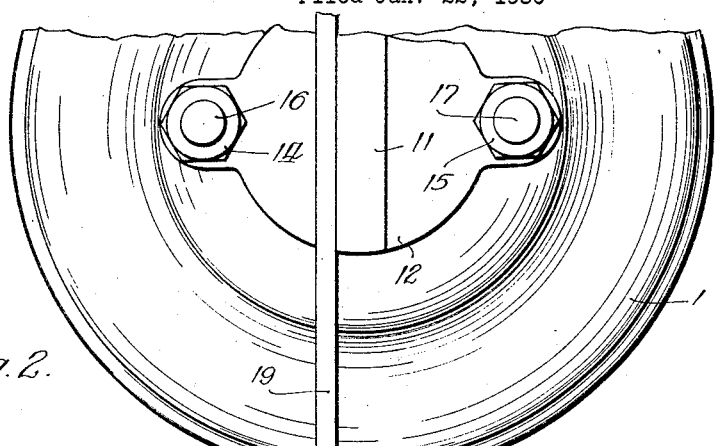
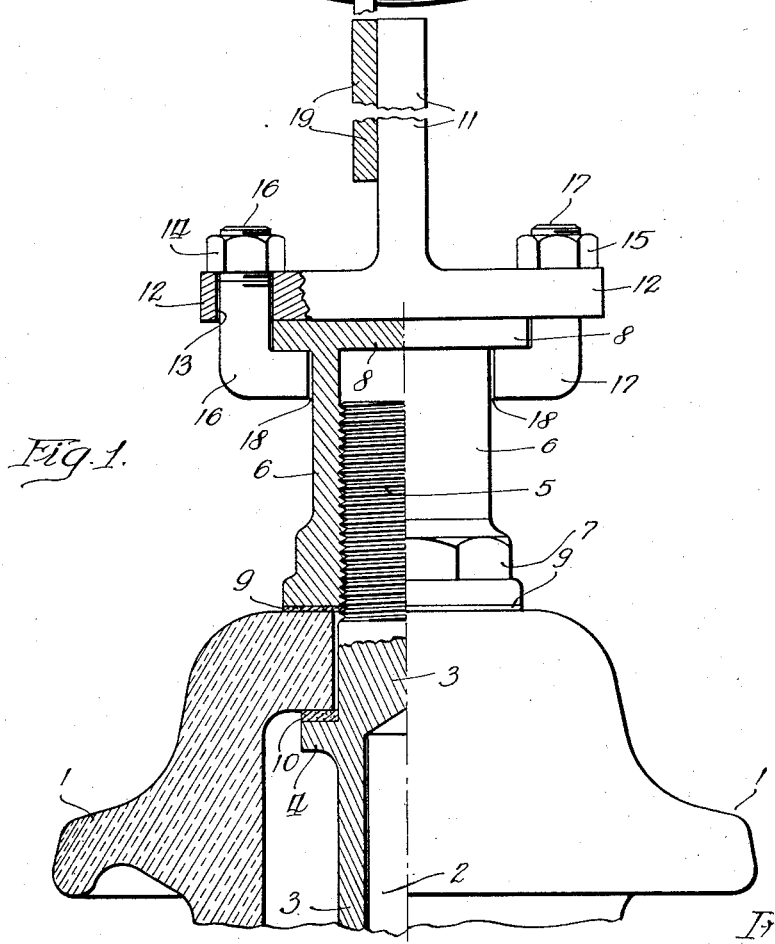
Inventor:
Joseph Rah Patented Mar. 14, 1933

1,901,666

UNITED STATES PATENT OFFICE

JOSEPH RAH, OF CHICAGO, ILLINOIS, ASSIGNOR TO THE DELTA-STAR ELECTRIC COMPANY, OF CHICAGO, ILLINOIS, A CORPORATION OF ILLINOIS

CABLE TERMINATOR CAP ASSEMBLY

Application filed January 22, 1930. Serial No. 422,536.

This invention relates, generally speaking, to so-called cable terminators, sometimes also referred to as end-bells or pot heads, and is more particularly concerned with means for providing a novel and improved cap assembly for such terminators to facilitate the connection between the terminators and a current carrying conductor, referred to as a bus bar.

Various difficulties have been experienced in the past in connection with the manner of joining the cable, terminating at a given locality, to a bus bar, and problems have arisen which will be outlined in the following, before entering a discussion of the present invention.

A cable terminating at a certain locality, is attached to and within a terminator, which consists, in one embodiment, of an insulating hollow body, sealed oil-tight, and provided for receiving the end of the cable and having externally projecting terminal means for completing the connection between the cable conductor and a bus bar. The present invention is not particularly concerned with the detailed structure of the terminator itself, but chiefly with the top or cap assembly thereof, and the description of the terminator proper will, therefore, be omitted.

Now, assuming the cable to be attached oil-tight within such a terminator in some suitable and known manner, the problem arises to complete the connection between the externally projecting terminal, which is in conductive relation with the conductor of the cable, and the bus bar, in other words, to provide for joining the terminal of the terminator to a current conducting or distributing body. The terminal of the terminator, which is joined to the end of the conductor of the cable within the insulating body, projects from the terminator cap and is usually round. The bus bar is usually a flat bar, mounted according to the requirements of a given locality.

The problem is to connect the terminal projecting from the terminator, with the bus bar, in an efficient, simple and dependable manner. Undue strain and stresses must be avoided.

The ideal case would be one in which a rectangular terminal projecting vertically from a terminator is to be joined to a rectangular bus bar extending at right angle to the terminal and perfectly aligned with the latter and disposed a proper distance therefrom. A simple and known clamp provision for securely joining the terminator with the bus bar would solve this simple problem. Such ideal case, however, is never encountered. The bus bar, mounted adjacent the terminator, is usually out of register with the latter, and fitting is necessary, involving bending and twisting of the cable in order to bring the terminator in proper alignment with the bus bar. Furthermore, the terminal projecting from the terminator is usually round and the bus bar is flat. Some intermediate member is required in order to join the terminal and the bus bar.

Now let us assume a case in which the bus bar is disposed at a certain angle, not in alignment with the terminal of the cable terminator, but at an angle or transverse to it. It will at once be seen that such case would necessitate radial fitting, that it, twisting of the terminal and of the cable in order to furnish the proper alignment to the bus bar, with resulting strains and stresses detrimental to the terminator and to the cable.

Neglecting entirely the danger of loosening the joint or breaking the terminator insulating body in the attempt of twisting the terminal into line with the bus bar, and also neglecting the waste of time incident to this fitting, the disadvantage remains that the resulting stresses might produce cracks in the insulating body of the terminator, causing leakage, and thus requiring repair soon after installation, increasing to some degree the cost of installation and maintenance, while rendering unsafe conditions.

It is the principal object of the invention to overcome the disadvantages mentioned previously by furnishing a cable terminator cap assembly having a radially adjustable terminal, in order to secure instantaneous adjustment without radial fitting, in a case in which the bus bar is at an angle or transversal to the terminal projecting from the terminator.

The invention provides a solution of the problem of joining a rigid round stud such as is commonly employed to lead a conductor through or from a bushing, etc., to a flat bus bar and particularly useful where radial fitting is required in order to align the parts properly.

Other objects relate to the structure of the terminator assembly, which is one of utmost simplicity, with all parts easily accessible for assembly and adjustment, at the same time rendering a reliable and secure point of contact between the cable conductor within the terminator and the terminal projecting therefrom.

The invention will now be described with reference to the accompanying single sheet of drawing.

Figure 1 shows a side view of the novel terminator cap assembly, partly in cross-section; and Figure 2 represents a top view of the same.

Reference numeral 1 indicates the top portion of the usual hollow insulating terminator bell or pot head. The terminating cable is attached within this insulating body, the end of the cable conductor being designated by reference numeral 2. Firmly attached to this portion of the cable conductor 2 is a member 3, having a collar 4 and a threaded upper portion 5. The member 3, which is firmly attached to the cable conductor 2, serves for securing the insulating body 1, by means of a shoulder bushing 6 which is provided, at its lower end, with a hexagonal structure 7, for tightening and, at its upper end, with a collar or shoulder 8. The gaskets 9 and 10 are inserted between the insulating body 1 and the shoulder bushing 6 and between the insulating body 1 and the collar 4 of member 3, respectively, in order to provide for an oil-tight seat sealing the assembly.

It will be seen from the above, that the collar bushing 6 is firmly secured to, and represents an oil-tight unit with the terminator bell 1 and the cable conductor 2, with the member 3 interposed as explained.

The terminal stud 11 is integral with, or permanently secured to, the terminal plate 12 which is provided with holes 13 for receiving the angular bracket bolts 16 and 17. These bracket bolts 16 and 17 are adapted to take hold of the collar 8. A tightening of nuts 14 and 15, attached to the bracket bolts 16 and 17, will, therefore, effect a firm connection between the terminal plate 12 and the collar 8 of bushing 6 securing the terminal stud 11 in a definite radial and axial relation with regard to the terminator bell 1. Should a radial adjustment of the terminal stud 11 be necessary in order to effect alignment with a bus bar disposed at a certain angle, the bolts 14 and 15 are loosened, the stud 11 is rotated to the desired radial position, and the bolts are tightened again. A clearance 18 is provided between the brackets 16 and 17 and the bushing 6, in order to insure operation without friction. It is, of course, understood that there is also sufficient clearance between the shanks of the bracket bolts and the periphery of collar 8.

Numeral 19 designates, in cross section, the flat bus bar to which the terminal stud 11 may be secured by means of simple flat sectional clamp plates.

Variations in the structure of the different parts of the assembly and of the entire structure are possible. The terminal stud 11 might be made circular instead of rectangular; likewise, instead of providing only two bracket bolts or screws, as shown, three or more such bolts might be used for obtaining the results disclosed, without altering the spirit of the invention.

I want to have it particularly understood that I do not want to be limited in the application of the device, to the precise structure shown in the drawings and described in the foregoing, but that I intend to limit the invention only to and within the limitations and the scope of the appended claim.

I claim as my invention:—

In combination, a hollow body of insulation having a top portion provided with an opening, a conducting stud provided with a peripheral flange intermediate its ends, said stud being externally threaded on one side of the flange and provided with an internal longitudinal bore on the other side of the flange for receiving the end of a cable conductor, the threaded end of the stud being projected outwardly through the opening in said top portion, a gasket on the flange, said gasket bearing against the inside of the top portion and providing a sealing closure for said opening, a conducting bushing threaded on the stud and bearing on the outside of said top portion to prevent the withdrawal of the stud through the opening, said bushing having a seating surface at its end remote from the body of insulation, a terminal member seated on said seating surface and freely movable thereon in a plane normal to the axis of the stud and having a flat contact making portion at right angles to said plane, and means for clamping the terminal member in position on said seating surface for adjustably fixing the position of the flat contact making portion of the terminal.

In witness whereof, I hereunto subscribe my name this 20th day of January, 1930.

JOSEPH RAH.